C. G. LUNDHOLM.
SET DEVICE FOR COLLARS AND THE LIKE.
APPLICATION FILED MAR. 14, 1914.
1,179,332.
Patented Apr. 11, 1916.
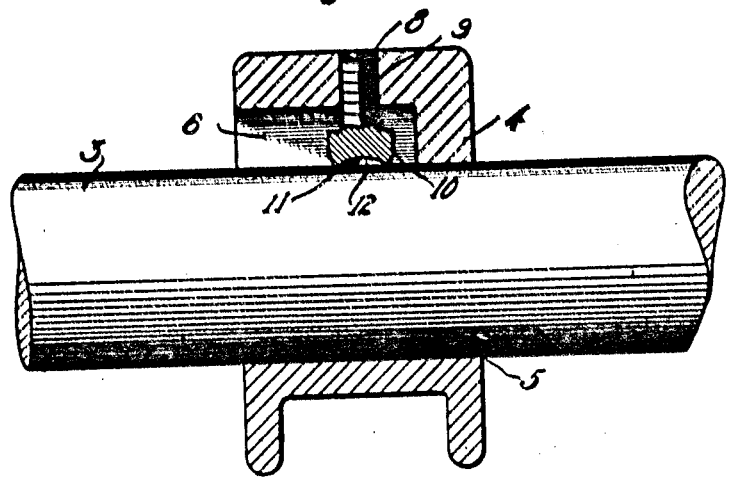
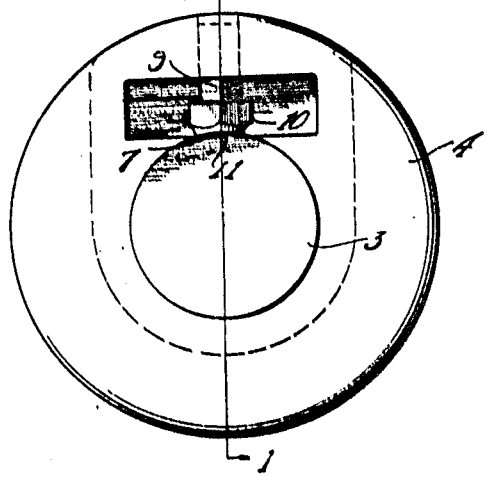
Witnesses
Inventor:
Charles G. Lundholm
Att'ys

UNITED STATES PATENT OFFICE.

CHARLES G. LUNDHOLM, OF SAN BERNARDINO, CALIFORNIA.

SET DEVICE FOR COLLARS AND THE LIKE.

1,179,332.  Specification of Letters Patent.  Patented Apr. 11, 1916.

Application filed March 14, 1914. Serial No. 824,678.

*To all whom it may concern:*

Be it known that I, CHARLES G. LUNDHOLM, a citizen of the United States, residing at San Bernardino, in the county of San Bernardino, State of California, have invented new and useful Improvements in Set Devices for Collars and the like, of which the following is a specification.

This invention relates to a set device for attaching collars, wheel hubs and the like on shafts.

In the ordinary methods of attaching collars, hubs and the like to shafts, set screws are usually employed by introducing them through threaded openings in the collar or hub with their inner ends screwed against the periphery of the shaft forming slight indentations in the latter and effecting the necessary engagement between the collars or hubs and the shaft; the heads of the set screws usually projecting beyond the outer faces of the collars or hubs. This construction is objectionable in that the projecting heads of the set screws constitute a source of danger since they are liable to catch the clothing of persons near the shaft when the latter is in motion, thus frequently being the cause of injury.

It is the object of this invention to overcome the above difficulties by so forming the hub or collar and arranging the set screw thereon that no part of the set screw will project from the periphery of the collar or hub.

A further object is to provide a means for setting collars, hubs and the like on shafts, which will obviate counter-sinking the bores for the reception of the set screw, which construction is objectionable in that considerable difficulty is met in sinking the head of the set screw below the outer surface of the collar or hub in order that no portions of the screw will project therefrom.

A further object is to provide a means whereby the set screw head will be concealed within a collar or hub and at the same time be so arranged that there will be little danger of breaking the set screw when it is being tightened.

The invention primarily resides in a hub or collar formed with an end recess communicating with the bore thereof and having an internally threaded bore leading from the exterior of the collar or hub into a recess, and a set screw threaded to engage the bore and extending thereinto from the recess and having a head portion arranged within the recess adapted to engage a shaft on which the collar or hub is mounted.

The invention is illustrated in the accompanying drawings, in which:

Figure 1 is a view in vertical section on the line 1—1 of Fig. 2 partly in elevation of a collar constructed in accordance with this invention. Fig. 2 is an end view of same.

More specifically, 3 indicates a shaft and 4 designates a collar having a central bore 5 to receive the shaft 3. Formed in one end of the collar is a depression or recess 6 arranged tangential to the bore 5 and communicating therewith through a slot 7. The recess 6 is of such length and height as to permit the ready introduction therein of an ordinary set-screw wrench.

Formed in the collar 4 is an internally threaded bore 8 which extends radially thereof opposite the slot 7 approximately at the longitudinal center of the collar. This bore 8 is designed to receive a stud bolt or set screw 9 having a threaded portion adapted to be screwed into the recess 8 from the interior of the recess 6. The set screw 9 is formed with a hexagonal head 10 to facilitate its engagement by a tool, which head is normally disposed in the recess 6 and thus concealed. Formed on the end of the head 10 is an annular beveled rim 11 surrounding a concavity 12 in the screw head which rim is adapted to engage the periphery of the shaft 3 when the set screw is engaged therewith.

In the application of the invention the set screw 9 is screwed sufficiently far into the threaded bore 8 so that the head thereof will clear the periphery of the shaft 3 and permit of the collar being placed thereon. The set screw 9 is then turned by means of a suitable wrench introduced into the open outer end of the recess 6 and screwed in such direction that the beveled rim 11 will be crowded against the shaft 3 into engagement therewith; the set screw 9 thus bearing between the shaft and the collar and effectively clamping the collar against movement. The beveled rim 11 will cut slightly into the surface of the shaft 3 and thereby form an effecting engagement to prevent shifting of the collar in any direction in relation to the shaft 3.

The threaded stem of the set screw 9 is of such length that when it is adjusted to engage the shaft as just described, and as shown in Fig. 1, its upper end will not project beyond the surface of the collar. In event such projection should exist the protruding portion may be filed off so as to present a smooth surface on the periphery of the collar and thereby eliminate any danger of its engagement with the clothing of workmen or those near the shaft.

While I have described the invention as applied to the collar, it is manifest that it is equally applicable to the construction of the hubs of gear wheels, pulleys, eccentrics and other devices for attachment to shafts.

What I claim is:

1. A collar or hub fastening, comprising a member formed with a shaft receiving bore and having a recess formed therein connecting with the bore through a slot and having a radially extending threaded bore passing from the recess to the outer periphery of the member, and an enlarged headed set screw arranged in said threaded bore with its head disposed in the recess to bear against a shaft on which the collar or hub is mounted.

2. A collar having a shaft receiving bore and an end recess communicating with said bore through a slot, and an enlarged headed set screw arranged within the recess and threaded into the upper wall thereof with its head engageable with a shaft in the bore.

3. A collar or hub having a shaft receiving bore therethrough and an end recess communicating with said bore through a slot, and a threaded bore leading from the upper wall of the recess in radial relation to the collar or hub, and an enlarged headed set screw having a threaded portion and a head portion arranged within the recess with the threaded portion engaging the threaded bore and positioned with its head within the recess to engage a shaft on which the collar or hub is mounted.

4. A collar or hub having a shaft receiving bore therethrough and an end recess communicating with said bore through a slot, and a threaded bore leading from the upper wall of the recess in radial relation to the collar or hub, and an enlarged headed set screw having a threaded portion and a head portion arranged within the recess with the threaded portion engaging the threaded bore and positioned with its head within the recess, the head of said screw being formed with an annular beveled shaft engaging rim adapted to engage a shaft on which the collar or hub is mounted.

In witness that I claim the foregoing I have hereunto subscribed my name this 26th day of February, 1914.

CHARLES G. LUNDHOLM.

Witnesses:
A. H. PARRISH,
FRANK OWEGER.

Copies of this patent may be obtained for five cents each, by addressing the "Commissioner of Patents, Washington, D. C."